United States Patent
Kim

(10) Patent No.: US 9,006,602 B2
(45) Date of Patent: Apr. 14, 2015

(54) GAS INSULATED SWITCHGEAR

(75) Inventor: Hyung Choon Kim, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 20 days.

(21) Appl. No.: 14/117,651

(22) PCT Filed: Oct. 11, 2011

(86) PCT No.: PCT/KR2011/007510
§ 371 (c)(1),
(2), (4) Date: Nov. 14, 2013

(87) PCT Pub. No.: WO2012/157820
PCT Pub. Date: Nov. 22, 2012

(65) Prior Publication Data
US 2014/0083832 A1 Mar. 27, 2014

(30) Foreign Application Priority Data
May 16, 2011 (KR) .......................... 10-2011-0045596

(51) Int. Cl.
*H01H 3/40* (2006.01)
*H01H 31/02* (2006.01)
*H01H 33/34* (2006.01)
(Continued)

(52) U.S. Cl.
CPC .............. *H02B 13/035* (2013.01); *H01H 3/264* (2013.01); *H01H 33/36* (2013.01); *H01H 33/42* (2013.01); *H01H 33/64* (2013.01)

(58) Field of Classification Search
CPC ....... H01H 33/02; H01H 33/04; H01H 33/42; H01H 33/64; H01H 33/66; H01H 33/44; H01H 3/264; H01H 2033/426; H02B 5/06; H02B 7/01

USPC ........ 218/154, 156; 200/48 R, 526, 527, 528, 200/500, 507; 361/618
See application file for complete search history.

(56) References Cited

U.S. PATENT DOCUMENTS 3,801,768 A * 4/1974 Meyer ........................ 200/253.1
4,310,214 A * 1/1982 Carlson ......................... 439/781
(Continued)

FOREIGN PATENT DOCUMENTS

| KR | 20-0291485 Y1 | 10/2002 |
| KR | 10-0370103 B1 | 1/2003 |
| KR | 10-0797982 B1 | 1/2008 |
| KR | 10-1026842 B1 | 4/2011 |

OTHER PUBLICATIONS international Search Report for PCT/KR20111007510 mailed May 24, 2012 from Korean Intellectual Property Office.

*Primary Examiner* — Renee Luebke
*Assistant Examiner* — William Bolton
(74) *Attorney, Agent, or Firm* — Sherr & Jiang, PLLC

(57) ABSTRACT

A gas insulated switchgear includes an enclosure, a first fixed conductor, one side of the first fixed conductor being bent at a right angle and another side of the first fixed conductor being fixed on one side of the enclosure, a second fixed conductor configured to be spaced apart from the first fixed conductor and configured to be fixed on another side of the enclosure, a screw configured to form an axis on inner of the enclosure and being spaced apart from the first and second fixed conductors and a movable conductor configured to move along the axis through a rotation of the screw, one side of the movable conductor being in contact with the second fixed conductor.

8 Claims, 2 Drawing Sheets

(51) Int. Cl.
*H02B 5/00* (2006.01)
*H02B 13/035* (2006.01)
*H01H 3/26* (2006.01)
*H01H 33/36* (2006.01)
*H01H 33/42* (2006.01)
*H01H 33/64* (2006.01)

(56) References Cited

U.S. PATENT DOCUMENTS 5,165,533 A * 11/1992 Wilentchik et al. ........... 200/500
5,915,544 A *  6/1999 Miyazaki ...................... 200/561
2001/0025828 A1  10/2001 Gutalj

* cited by examiner

US 9,006,602 B2

GAS INSULATED SWITCHGEAR

CROSS REFERENCE TO PRIOR APPLICATIONS

This application is a National Stage Patent Application of PCT International Patent Application No. PCT/KR2011/007510 filed on Oct. 11, 2011 under 35 U.S.C. §371, which claims priority under 35 U.S.C. §119 to Korean Patent Application No. 10-2011-0045596 filed on May 16, 2011, which are all hereby incorporated by reference in their entirety.

BACKGROUND OF THE INVENTION

1. Field of the Invention

The present invention relates to a gas insulated switchgear and more particularly, to a gas insulated switchgear implementing a switch using a perpendicular movement of one axis.

2. Background of the Invention

In general, a Gas Insulated Switchgear (GIS) corresponds to a switch device shutting off a current when a fault current is generated. The GIS embeds a circuit breaker, a disconnecting switch, a ground switch, a current transformer and a busbar and so on in a grounded metal tank and charges an SF6 gas having a good characteristic of insulation and extinction. The GIS has advantages such as a substation minimization, a safety and reliability improvement, an operation and maintenance easiness, an environment suitability. The GIS is categorized into a two phase switch and a three phase switch and the two phase switch has been developed due to an easiness, a safeness and a small space.

SUMMARY OF THE INVENTION

In some embodiments, a gas insulated switchgear includes an enclosure, a first fixed conductor, one side of the first fixed conductor being bent at a right angle and another side of the first fixed conductor being fixed on one side of the enclosure, a second fixed conductor configured to be spaced apart from the first fixed conductor and configured to be fixed on another side of the enclosure, a screw configured to form an axis on inner of the enclosure and being spaced apart from the first and second fixed conductors and a movable conductor configured to move along the axis through a rotation of the screw, one side of the movable conductor being in contact with the second fixed conductor.

The one side of the movable conductor may be bent toward the first fixed conductor at a right angle and another side of the movable conductor may be bent toward the second fixed conductor at a right angle.

The screw may pass through the movable member being combined with the movable conductor and the screw to form an axis. In one embodiment, the movable member may be screw-coupled to the screw to move up and down along a direction of the axis according to a rotation of the screw.

The second fixed conductor may be constantly and electrically connected with the movable conductor regardless of a movement of the movable conductor.

A contact region of the first fixed conductor and the movable conductor may be welded or combined with an arc-resisting material.

DETAILED DESCRIPTION OF THE EMBODIMENTS

Figure 1:
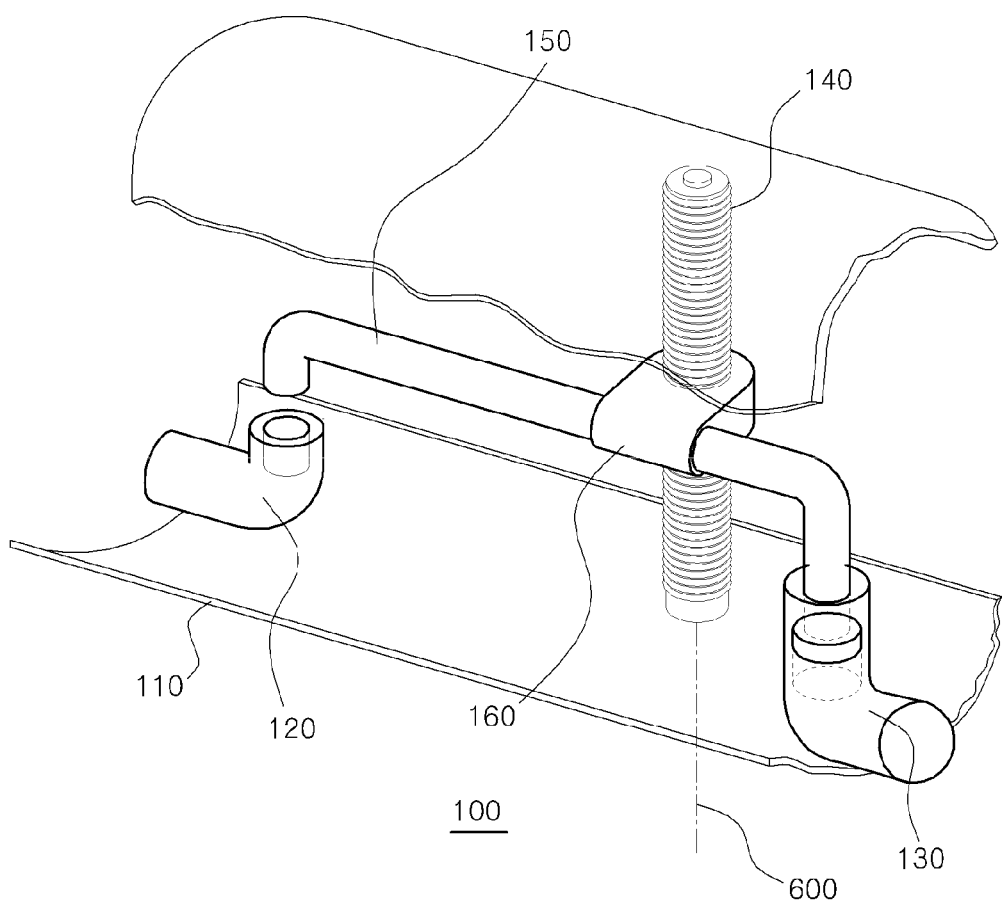
FIG. 1 is a perspective diagram illustrating a gas insulated switchgear according to an example embodiment of the present invention.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~ between", "immediately ~ between" or "adjacent to ~" and "directly adjacent to ~" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a perspective diagram illustrating a gas insulated switchgear according to an example embodiment of the present invention.

Referring to FIG. 1, a gas insulated switchgear 100 includes an enclosure 110, first and second fixed conductors 120 and 130, a screw 140, a movable contact 150 and movable member 160.

The enclosure 110 is an insulating body being charged with an insulated gas and corresponds to a structure supporting the screw 140 and the first and second fixed conductors 120 and 130.

The one side of the first fixed conductor 120 may be bent at a right angle and may form a hall and another side of the first fixed conductor 120 may be fixed on one side of the enclosure 110. In one embodiment, the first fixed conductor 120 may be connected with a busbar thereby an electric current may be applied.

The second fixed conductor 130 may be spaced apart from the first fixed conductor 120 and may be fixed on another side of the enclosure 110. The second fixed conductor 130 may be constantly and electrically connected with the movable conductor 150 regardless of a movement of the movable conductor 150. In one embodiment, the second fixed conductor 130 may form a hall being extended to a longitudinal direction of the screw 140 on one side of the second fixed conductor 130 to support a movement of the movable conductor 150 and to maintain an electrical connection with the movable conductor 150.

In one embodiment, an opening (i.e., front part) of the hall in the second fixed conductor 130 is narrower than that inner of the hall. In one embodiment, the second fixed conductor 130 may be connected with a main busbar thereby an electric current may be applied.

The screw 140 may form an axis 600 on inner of the enclosure 110 and may be spaced apart from the first and second fixed conductors 120 and 130. In one embodiment, the screw 140 may pass through the movable member 160 to form the axis 600 with respect to the first fixed conductor 120. The screw 140 may rotate on the axis 600 and both ends of the screw 140 may fixed on inner of the enclosure 110. The screw 140 may be rotated through a mechanical connection outside the enclosure 110.

The movable conductor 150 corresponds to a component being movable along the axis 600 through a rotation of the screw 140. Both ends of the movable conductor 150 may be bent at a right angle and an overall frame of the movable conductor 150 may be cylindrical. In one embodiment, one side of the movable conductor 150 may be bent toward the hall of the first fixed conductor 120 at a right angle and bent another side at a right angle may be inserted to the hall of the second fixed conductor 130.

In one embodiment, another side of the movable conductor 150 may be connected with inner of the hall of the second fixed conductor 130 and may be more widened to a degree where another side of the movable conductor 150 is larger than an opening part of the hall to enlarge a contact area between the movable conductor 150 and the second fixed conductor 130.

In one embodiment, the movable conductor 150 may be combined with the movable member 160 to move up and down along a longitudinal direction of the screw 140 according to a movement of the movable member 160.

The movable member 160 is an insulating body being combined with the movable conductor 150 and the screw 140. The movable member 160 may be screw-coupled to the screw 140 to move up and down along a direction of the axis 600 according to a rotation of the screw 140.

In FIG. 1, the gas insulated switchgear 100 is open in case where the movable conductor 150 is not contacted the first fixed conductor 120.

In one embodiment, a contact region of the first fixed conductor 120 and the movable conductor 150 may be welded or combined with an arc-resisting material. This may prevent from damages due to the arc being caused by a high voltage current when the movable conductor 150 are spaced apart from the first fixed conductor 120.

Figure 2:
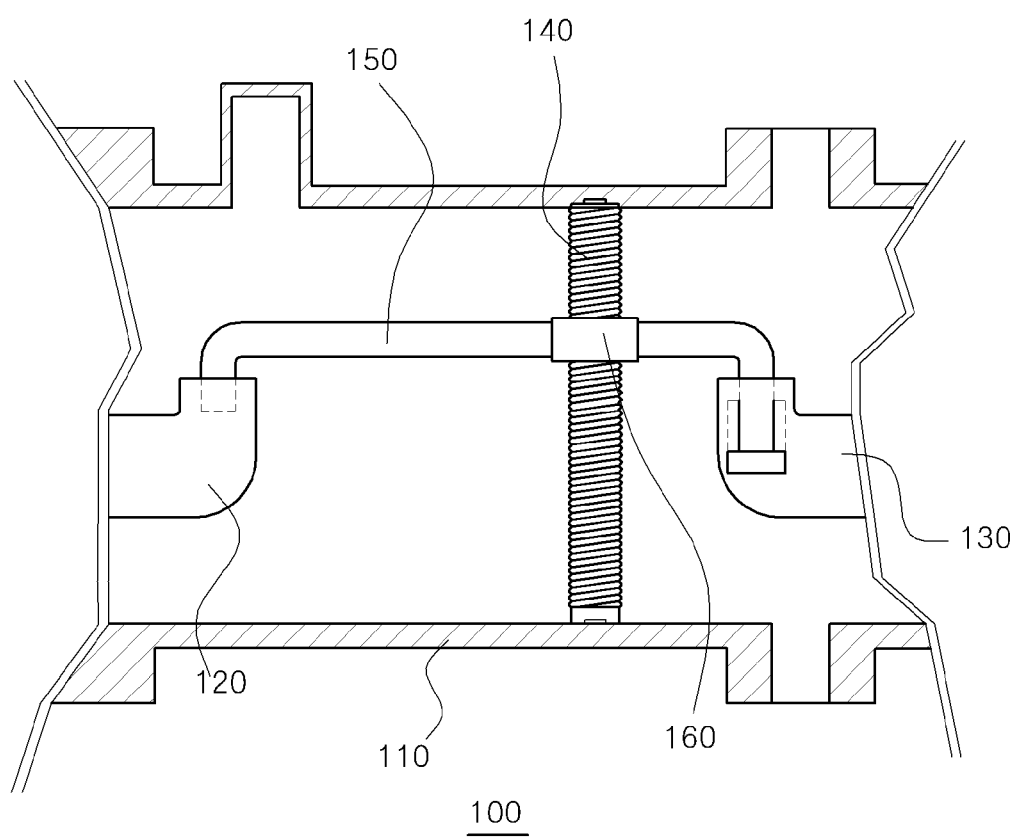
FIG. 2 is a cross sectional diagram illustrating a gas insulated switchgear in FIG. 1 where the gas insulated switchgear is closed.

FIG. 2 is a cross sectional diagram illustrating a gas insulated switchgear in FIG. 1 where the gas insulated switchgear is closed.

In FIG. 2, when the screw 140 rotates in one direction, the movable member 160 being combined with the screw 140 may move down due to a turning force to move down the movable conductor 150 being combined with the movable member 160. In one embodiment, when the movable conductor 150 moves down, the movable conductor 150 may insert the bent one side to the hall of the first fixed conductor 120 and may be electrically connected with the first fixed conductor 120.

In one embodiment, when a system is in a steady state, the first fixed conductor 120 is electrically connected with the second fixed conductor 130.

In one embodiment, the first second fixed conductor 120 and second fixed conductor 130 may be connected with a busbar and a main busbar to configure a disconnecting switch or may be connected with a main busbar and a ground terminal to configure a ground switch.

The disclosed technique may have the following effects. That is, unless otherwise specified, but rather should be construed broadly within its scope as defined in the appended claims. Therefore, various changes and modifications that fall within the scope of the claims, or equivalents of such scope are therefore intended to be embraced by the appended claims.

The gas insulated switchgear according to one embodiment may be operated based on an axial movement and may cause inner of the gas insulated switchgear to be simply configured thereby the gas insulated switchgear may be effectively implemented.

The gas insulated switchgear according to one embodiment is operated through the up and down movement of a movable conductor. Therefore, an overall size of the gas insulated switchgear may be minimized in comparison with that of a conventional gas insulated switchgear.

Although this document provides descriptions of preferred embodiments of the present invention, it would be understood by those skilled in the art that the present invention can be modified or changed in various ways without departing from the technical principles and scope defined by the appended claims.

| Description of symbols | |
|---|---|
| 100: GAS INSULATED SWITCHGEAR | 110: ENCLOSURE |
| 120: FIRST FIXED CONDUCTOR | |
| 130: SECOND FIXED CONDUCTOR | |
| 140: SCREW | |
| 150: MOVABLE CONDUCTOR | |
| 160: MOVABLE MEMBER | |

What is claimed is:

1. A gas insulated switchgear comprising:
    an enclosure;
    a first fixed conductor installed inside the enclosure and having a first end being bent at a right angle and a second end being fixed on one side of the enclosure;
    a second fixed conductor configured to be spaced apart from the first fixed conductor and configured to be fixed on another side of the enclosure in the enclosure;
    a screw configured to form an axis in an inner space of the enclosure and being spaced apart from the first and second fixed conductors;
    a movable conductor associated with the screw and configured to move along the axis when the screw rotates, the movable conductor having a first end being in contact with the second fixed conductor and a second end which is connectable with and disconnectable from the first end of the first fixed conductor by a rotation of the screw.

2. The gas insulated switchgear of claim 1, wherein the second end of the movable conductor is bent toward the first end of the first fixed conductor at a right angle and wherein the second end of the movable conductor is bent toward the second fixed conductor at a right angle.

3. The gas insulated switchgear of claim 1, further comprising:
    a movable member movably engaged with the screw and fixed to the movable conductor,
    wherein the screw passes through the movable member to form the axis.

4. The gas insulated switchgear of claim 3, wherein the movable member is screw-coupled to the screw to move up and down along an axial direction of the screw according to the rotation of the screw.

5. The gas insulated switchgear of claim 1, wherein the second fixed conductor is constantly and electrically connected with the first end of the movable conductor regardless of a movement of the movable conductor.

6. The gas insulated switchgear of claim 1, wherein a contact region of the first fixed conductor and the movable conductor is welded or combined with an arc-resisting material.

7. The gas insulated switchgear of claim 1, wherein the first end of the first fixed conductor includes a groove thereon so that the second end of the movable conductor is inserted in the groove when the movable conductor and the first fixed conductor are electrically connected with each other.

8. The gas insulated switchgear of claim 1, wherein the second fixed conductor includes a cavity therein and a mouth having a width smaller than a diameter of the cavity,
    wherein the first end of the movable conductor includes a flange extended from the first end of the movable conductor and inserted in the cavity, wherein the flange is larger than the mouth.

* * * * *